United States Patent [19]

Hartley et al.

[11] 4,292,127

[45] Sep. 29, 1981

[54] NUCLEAR FUEL PINS

[75] Inventors: Kenneth Hartley; Trevor L. J. Moulding, both of Seascale; Norman Rostron, Lytham St. Annes, all of England

[73] Assignee: United Kingdom Atomic Energy Authority, London, England

[21] Appl. No.: 26,803

[22] Filed: Apr. 3, 1979

[30] Foreign Application Priority Data

Apr. 14, 1978 [GB] United Kingdom ............... 14807/78

[51] Int. Cl.³ ............................................. G21G 1/02
[52] U.S. Cl. ...................................... 176/17; 176/68; 176/74; 176/91 SP
[58] Field of Search ................. 176/80, 17, 91 SP, 68, 176/74

[56] References Cited

U.S. PATENT DOCUMENTS 3,660,227  5/1972  Ackroyd ............................. 176/17
3,669,832  6/1972  Boettcher ........................... 176/17
4,096,033  6/1978  Barry .................................. 176/17

Primary Examiner—Donald P. Walsh
Attorney, Agent, or Firm—Larson and Taylor

[57] ABSTRACT

A nuclear fuel pin for a fast breeder nuclear reactor has a central fissile region containing fissile material in the form of vibro-compacted microspheres and axial breeder regions above and below the central region containing fertile material in the form of pellets or packed microspheres. The microspheres containing fissile material are of two sizes with the smaller microspheres packed into the interstices between the larger microspheres. To prevent intermixing of the material of the fissile and fertile regions a barrier layer is located between the fissile region and each breeder region which comprises a layer of microspheres having a diameter intermediate the diameter of the larger and smaller diameter microspheres of the fissile region.

3 Claims, 2 Drawing Figures

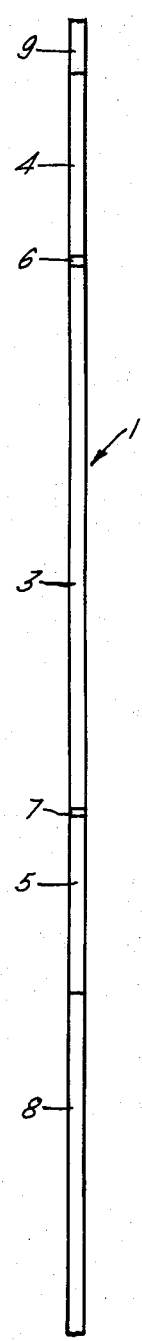
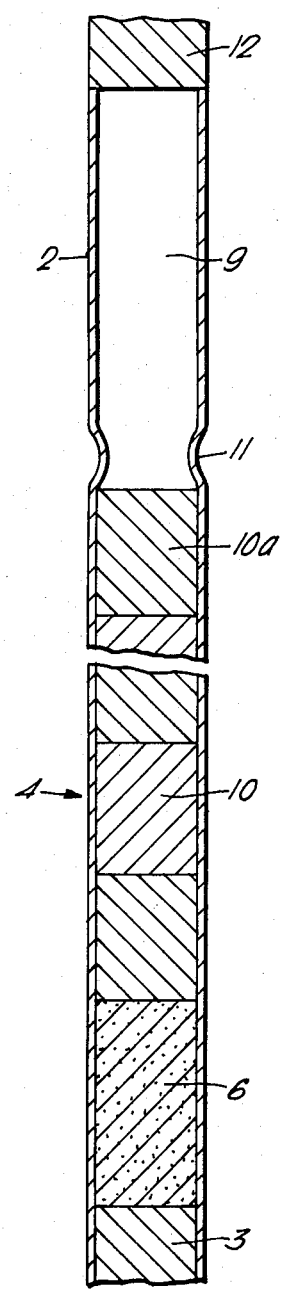

NUCLEAR FUEL PINS

BACKGROUND OF THE INVENTION

This invention relates to nuclear fuel pins.

In a fast breeder nuclear reactor the core which contains the fissile nuclear fuel material is surrounded by a breeder blanket of fertile material which may include axial breeder blankets above and below the core. In one type of fuel pin suitable for use in a fast breeder nuclear reactor the axial breeder blankets are provided by fertile material above and below the fissile nuclear fuel material in the pin. Conveniently, the fissile nuclear fuel is in the form of microspheres packed inside the fuel pin by vibratory lcompaction. To ensure sufficiently high packing density within the pins microspheres of different sizes may be used. It is known to use microspheres of two or three sizes to ensure the required packing density of the fissile nuclear fuel material. In the case of a fuel pin having microspheres of two sizes the larger microspheres are placed in the fuel pin first and the fuel pin is vibrated to compact the microspheres before microspheres which are small enough to pass between the larger microspheres are added and the fuel pin is vibrated until all the fissile material is compacted.

After a nuclear fuel pin has been irradiated in the core of a fast breeder nuclear reactor it is reprocessed to separate the reusable fissile material from the products of nuclear fission. The breeder blanket and fissile nuclear fuel material are preferably reprocessed separately and so it is advantageous if the fissile and fertile regions remain separate within the pin. It is an object of the present invention to seek to prevent the intermixing of the material in the fissile and fertile regions within a nuclear fuel pin.

SUMMARY OF THE INVENTION

According to the present invention a nuclear fuel pin has a central region containing fissile nuclear fuel material in the form of large and small diameter microspheres in which the small diameter microspheres are capable of passing through and packing into the interstices between the large diameter microspheres, axial regions containing breeder material above and below the central region, and barrier layers above and below the central region to separate the central region from the axial regions, the barrier layers comprising microspheres having a diameter intermediate the diameters of the large and small diameter microspheres to prevent intermixing of the material in the central and axial regions of the fuel pin. The microspheres of the barrier layers may comprise fissile or fertile materials.

DESCRIPTION OF THE DRAWINGS

The invention will be illustrated by the following description of a fuel pin for a nuclear reactor. The description is given by way of example only and has reference to the accompanying drawings in which:

FIG. 1 is a diagrammatic sectional representation of a nuclear fuel pin, and

FIG. 2 is a cross-sectional view of the upper portion of a fuel pin such as that shown in FIG. 1.

DESCRIPTION OF THE PREFERRED EMBODIMENT

The fuel pin 1 illustrated in FIG. 1 has a can 2 of stainless steel, a central region 3 containing fissile material, axial breeder regions 4, 5 containing fertile material above and below the central region 3 and barrier layers 6, 7 separating the central region 3 from the axial breeder regions 4, 5 respectively. The fuel pin also has a large plenum 8 at the bottom and a smaller plenum 9 at the top. In a typical fuel pin the overall length will be of the order of 220 cms, the central region 3 will be about 100 cms in length and each of the axial breeder regions 4, 5 will be about 30 cms long. The internal diameter of a fuel pin is typically of the order of 0.5 cms so in FIG. 1 the width of the fuel pin has been exaggerated for the sake of clarity.

The central region 3 contains fissile material contained in microspheres of two sizes. The larger microspheres have a diameter in the range 825 to $875\mu$ and contain mixed oxides of plutonium and uranium whereas the smaller microspheres have a diameter in the range 90 to $106\mu$. The smaller microspheres may also contain a mixed oxide of plutonium and uranium though it is preferable that the small microspheres contain only uranium dioxide to reduce the known hazards associated with the handling of particulate material of small size containing plutonium. The smaller microspheres are able to pass through and pack into the interstices between the larger spheres to provide a region of fissile material of the required packing density. The region of fissile material is produced by packing the larger microspheres into the pin and then adding the smaller microspheres and vibrocompacting so that the smaller spheres fill the interstices.

The axial breeder regions 4, 5 contain fertile material in which breeding of plutonium can occur. The fertile material is uranium dioxide preferably containing depleted uranium and may be in the form of pellets or microspheres.

The barrier layers 6, 7 contain microspheres which may contain fertile or fissile material preferably in the form of uranium dioxide and which have a diameter in the range 250 to $300\mu$. This size is intermediate that of the larger microspheres and the smaller microspheres and is such that the smaller microspheres cannot pass through the packed intermediate sized microspheres and the intermediate sized microspheres cannot pass through the packed larger microspheres. To pass between the interstices of an evenly packed bed of larger diameter spherical bodied a smaller spherical body must have a diameter that does not exceed 1/7 of the diameter of the larger body. In the fuel pin described above the smaller diameter microspheres have a diameter which is approximately one third of the diameter of the microspheres in the barrier layers 6, 7 and the intermediate sized microspheres have a diameter which is approximately one third of the diameter of the large diameter microspheres.

To avoid intermixing of the barrier layers 6, 7 with the material in the axial breeder regions 4, 5 the size of the pellets or microspheres must be chosen to prevent passage of microspheres from the barrier layers 6, 7 into the axial breeder regions 3, 4. For example if the fertile material is in the form of pellets the pellet diameter should be such that the intermediate diameter microspheres cannot pass through the annular gap between the pellet and the inside wall of the can 2. For example in a fuel pin having an inside diameter of 0.200 inches, pellets having a diameter in the range 0.194 to 0.196 inches would prevent microspheres of 250 to $300\mu$ diameter passing into the annular gap. If the axial breeder regions 4, 5 contain fertile material in the form of microspheres the diameter of these microspheres must be such that the microspheres containing the fertile material cannot pass into the barrier layer nor can the intermediate microspheres of the boundary layer pass into the packed microspheres in the axial breeder regions.

A knitted mesh separator may be placed on top of the barrier layer of intermediate sized spheres to further contain the spheres within the central region of the fuel pin. Such a separator is conveniently manufactured from molybdenum. However it is preferred if no molybdenum-containing components are included in fuel pins which are to be subsequently reprocessed and utilising the present invention it is not essential that such separators be used.

To manufacture a fuel pin according to the present invention the lower breeder material is placed in the can 2 of the fuel pin to which a lower end cap has already been attached. Means which are known in the art are used to support the breeder material which forms the lower axial breeder region 5 so that it does not enter the lower plenum 8. Intermediate sized microspheres with a diameter of 250-300μ are then placed in the can and packed by vibrocompaction to form the lower barrier layer 7. Large microspheres having a diameter of 825 to 875μ containing fissile material are then placed in the can and vibrocompacted to pack them evenly within the central region 3. Small microspheres having a diameter of 90 to 106μ are then metered in the can and the can vibrated to cause the small microspheres to pack into the interstices between the packed large microspheres to form a compacted fissile region of the fuel pin. Intermediate sized spheres (250 to 300 diameter) are then placed in the can and vibrocompacted to form the upper barrier layer 6 and the fertile material to form the upper breeder region 4 placed above the barrier layer 6.

In FIG. 2 is shown the upper portion of a fuel pin in which the fertile material is in the form of pellets. The annular gap (not shown) between the pellets 10 and the wall of the can 2 is not large enough to allow the passage of the intermediate sized spheres. When a sufficient number of pellets 10 have been inserted into the fuel pin to provide the desired length of upper axial breeder region 4 dimples 11 are formed in the wall of the can immediately above the uppermost pellet 10a to minimise axial movement of the pellets. The upper plenum 9 extends above the pellets 10 and the fuel pin is closed by an end cap 12 which is welded into place.

The present invention provides a fuel pin for use in fast breeder nuclear reactors containing fissile and fertile regions in which intermixing of the fissile and fertile material does not occur.

We claim:

1. A nuclear fuel pin has a central region containing fissile nuclear fuel material in the form of large and small diameter microspheres in which the small diameter microspheres are capable of passing through and packing into the interstices between the large diameter microspheres, axial regions containing breeder material above and below the central region, barrier layers above and below the central region to separate the central region from the axial regions, the barrier layers comprising microspheres having a diameter intermediate the diameters of the large and small diameter microspheres to prevent intermixing of the material in the central and axial regions of the fuel pin.

2. A nuclear fuel pin as claimed in claim 1 wherein the large diameter microspheres contain a mixed oxide of plutonium and uranium and have a diameter of 825 to 875μ the small diameter spheres contain uranium oxide and have a diameter in the range 90 to 106μ and the intermediate diameter spheres contain uranium oxide and have a diameter in the range 250 to 300μ.

3. A nuclear fuel pin as claimed in claim 1 wherein the breeder material is contained in cylindrical pellets of such a diameter that the annular gap between the pellets and the wall of the fuel pin is insufficient to allow passage of the intermediate diameter microspheres.

* * * * *